United States Patent [19]
Yamamoto et al.

[11] Patent Number: 6,136,401
[45] Date of Patent: *Oct. 24, 2000

[54] GLASS SUBSTRATE OF DISK FOR RECORDING INFORMATION, A DISK FOR RECORDING INFORMATION, AND A DISK DEVICE FOR RECORDING INFORMATION

[75] Inventors: Hiroki Yamamoto, Hitachi; Takashi Naito, Hitachioota; Takashi Namekawa, Hitachi; Ken Takahashi, Tokai-mura; Masahiro Watanabe, Yokohama; Noriyuki Takeo, Yamakita-machi, all of Japan

[73] Assignee: Hitachi, Ltd., Tokyo, Japan

[ * ] Notice: This patent is subject to a terminal disclaimer.

[21] Appl. No.: 09/487,785

[22] Filed: Jan. 20, 2000

Related U.S. Application Data

[63] Continuation of application No. 08/888,124, Jul. 3, 1997, Pat. No. 6,040,029.

[30] Foreign Application Priority Data

Jul. 18, 1996 [JP] Japan .................................. 8-189058
Oct. 24, 1996 [JP] Japan .................................. 8-282068

[51] Int. Cl.$^7$ .................................................. G11B 05/82
[52] U.S. Cl. ...................... 428/64.1; 428/64.2; 428/64.3; 428/64.4; 428/65.3; 428/694 PR; 428/694 ST; 428/694 SG; 360/135; 501/152
[58] Field of Search .................................. 428/64.1, 64.2, 428/64.3, 64.4, 65.3, 694 PR, 694 ST, 694 SG; 360/135; 501/152

[56] References Cited

U.S. PATENT DOCUMENTS

| | | | |
|---|---|---|---|
| 5,384,293 | 1/1995 | Omori et al. | 501/128 |
| 5,726,108 | 3/1998 | Taguchi et al. | 501/5 |
| 5,820,960 | 10/1998 | Kwon | 428/64.1 |

*Primary Examiner*—Stevan A. Resan
*Attorney, Agent, or Firm*—Antonelli, Terry, Stout & Kraus, LLP

[57] ABSTRACT

In accordance with the present invention, a glass substrate of a disk for recording information, containing oxides of rare earth elements and fine particles dispersed therein, and a disk for recording information and a disk apparatus for recording information using the glass substrate of the disk are provided. The glass substrate of the disk for recording information having preferable mechanical characteristics, as well as superior chemical stability, thermal stability, flatness, and transparency is provided, and a disk for recording information and a disk apparatus for recording information using the glass substrate of the disk are provided.

19 Claims, 5 Drawing Sheets

GLASS SUBSTRATE OF DISK FOR RECORDING INFORMATION, A DISK FOR RECORDING INFORMATION, AND A DISK DEVICE FOR RECORDING INFORMATION

This is a continuation of application Ser. No. 08/888,124, filed Jul. 3, 1997, now U.S. Pat. No. 6,040,029.

BACKGROUND OF THE INVENTION

The present invention relates to a glass substrate in the form of a disk for recording information, and more particularly, to a glass substrate in the form of a disk, for use in a fixed type magnetic disk recorder and in a photomagnetic disk apparatus, which is superior in chemical stability and thermal stability at a high temperature and in flatness. The invention also relates to a disk for recording information and a disk apparatus for recording information using the glass substrate.

Magnetic disks and photomagnetic disks are used at the present time as media for recording information in large scale computers and personal computers. Currently, substantial advances have been made in increasing the recording density and decreasing the size and weight of the media for recording information. In the field of the magnetic disk apparatus, magnetic disk substrates of small size, such as disks having diameters of 2.5 inches, 1.8 inches and 1.3 inches, have been developed. Not only the diameter, but the thickness of the disk substrate as well has been decreased. Accordingly, a substrate having a larger mechanical strength then ever is required. Furthermore, the levitating amount of the disk on the head has been decreased, and improvement in the flatness of the disk, which is capable of controlling the levitating amount, is required.

Conventionally, an aluminum alloy has been used as the material of the substrate for a magnetic disk. However, an aluminum alloy has the problem that it is deformed readily and exhibits an undesirable flatness at the disk surface after polishing on account of insufficient hardness. Furthermore, an aluminum alloy has another problem in that the layer of the magnetic recording medium is readily peeled off when the magnetic disk is contacted mechanically by the head. Therefore, a glass substrate having a smaller deformation, a more preferable flatness and a larger mechanical strength than the aluminum substrate has been developed. The glass substrate can be used also as the substrate for a photomagnetic disk, wherein the substrate itself is required to be transparent.

In order to use a glass substrate as the media to record information, chemically strengthened glass, having a mechanical strength which is increased by replacing alkali elements at the surface of the substrate with other alkali elements, and crystallized glass, wherein fine crystallized particles are deposited in an amorphous glass matrix, have been developed. However, the chemically strengthened glass has a problem in that the alkali ions tend to corrode the magnetic film and deteriorate the adhesive strength of the film during a heating step and a cleaning step in the magnetic film forming process, because of the presence of the alkali substituted layer at the surface of the film. Accordingly, JP-A-7-223845 (1995) has proposed a chemically strengthened glass, which was superior in chemical resistance, prepared by a further chemical treatment after the chemical strengthening.

On the other hand, crystallized glass has a problem in that the irregularity of the surface of the glass substrate after polishing was very large, because of the difference in abrasion resistance between the generated crystalline fine particles and the amorphous glass, so that a desirable flatness of the surface could not be obtained. Therefore, decreasing the levitating amount of the head was difficult for responding. In accordance with JP-A-7-300340 (1995), the flatness was improved by decreasing the particle size of the crystallized fine particles to the range of 5–100 nm.

However, the chemical strengthening method disclosed in JP-A-7-223845 (1995) has a problem in that making the characteristics of the substrate homogeneous after the chemical strengthening process and the polishing process in the chemical strengthening treatment is still difficult. Furthermore, providing an effective intermediate film to prevent a diffusion of alkaline ions between the magnetic film and the glass substrate, which is necessary to prevent the magnetic film from being corroded by the alkaline ions, has not been solved completely yet. In accordance with the crystallizing method disclosed in JP-A-7-300340 (1995), the obtained glass substrate has a low transmittance because the glass is colored to a milky color, and accordingly, the glass substrate is difficult to use as a substrate for optical information recording. Furthermore, the crystallizing method has another problem in that making the characteristics of the substrate homogeneous is difficult, because a fine precise crystallizing process is required.

In either case using the above methods, decreasing the production cost is difficult, because a post-treating process, such as a chemical strengthening process or a crystallizing process, is required.

SUMMARY OF THE INVENTION

One of the objects of the present invention is to provide a glass substrate in the form of a disk for recording information having a preferable mechanical strength, a desirable chemical stability and a sufficient optical transmittance for optical information recording, and which can be manufactured by a short process.

Another object of the present invention is to provide a disk for recording information, which can achieve a high recording density, and to effectively decrease the size and weight of the disk by using a thin disk having no intermediate film, and a disk recording apparatus using the same.

In order to achieve the above objects, the first feature of the present invention relate to an information recording disk comprising a film of a medium for recording information formed on at least one surface of a substrate in the shape of a disk, wherein the substrate is composed of a glass containing at least a rare earth element. The film of the medium for recording information can be formed directly on the surface of the substrate, or it can be formed indirectly on the surface of the substrate via an intermediate film (pre-coated film).

In accordance with the above structure, a disk for recording information having a sufficient mechanical strength to accommodate a thinning of the disk, and a desirable chemical stability and preferable homogeneity to avoid the necessity for an intermediate film, can be provided.

In accordance with the feature of the first invention, the thermal expansion coefficient of the glass is desirably in the range of $70-130 \times 10^{-7}$. The magnetic film is formed on the surface of a disk for recording information, such as a magnetic disk, a photomagnetic disk, and the like. The thermal expansion coefficient of the magnetic film is approximately $100 \times 10^{-7}$. Therefore, if the thermal expansion coefficient of the glass is not in the range of $70-130 \times 10^{-7}$, a stress is applied to the magnetic film in the magnetic film manufacturing process accompanying heat treatment, and the magnetic characteristics can be deteriorated, the magnetic film can be peeled off, or the substrate itself can generate cracks. Therefore, the thermal expansion coefficient is desirably in the above indicated range.

In accordance with the first feature of the invention, fine particles are dispersed in the glass, and the rare earth element is desirably contained in the fine particles. The strength of the glass can be increased by the presence of the fine particles being dispersed in the glass.

The amount of the rare earth element, which can be dissolved into a glass composition having a net structure, has an upper limit (a limit of solid solution). If the rare earth element is added to the in an amount glass exceeding the upper limit, the rare earth element is deposited in the glass matrix as a crystalline phase or an amorphous phase. The particles composed of the above crystalline phase or the amorphous phase are called fine particles. If the deposition of the rare earth element is not homogeneous, the fine particles can tee deposited partially by exceeding the upper limit of the solid solution. Therefore, the content of the rare earth element does not necessarily exceed the upper limit of the solid solution in the glass matrix. The rare earth element is desirably contained in both the glass matrix and the fine particles. The fine particles are desirably crystalline. Whether the fine particles are crystalline or amorphous can be readily determined by observing a lattice fringe image taken by a transmission electron microscope, because lattice stripes can be observed at the crystalline portion, but will not be observed at the amorphous portion.

The strength of the glass is improved by dispersing the fine particles in the glass matrix, because the fine particles have an effect to suppress deformation and breakage of the glass matrix when a stress is applied to the glass matrix. The higher strength improving effect of the dispersed fine particles can be obtained by the fine particles having a smaller particle size and when they are dispersed more uniformly.

In accordance with the first feature of the invention, the glass preferably contains a rare earth element in the range of 0.5–15% by weight to the total weight of the glass based on the amount converted to the oxide of $Ln_2O_3$ (Ln is a rare earth element).

When the content of the rare earth element is less than 0.5% by weight, the effect for improving the mechanical strength is not significant. When the content of the rare earth element exceeds 15% by weight, the size of the fine particles is increased, and the transmittance for white light is decreased. Therefore, an information recording disk having a preferable mechanical strength balanced with a desirable transmittance for white light can be provided by the composition described above. However, in a case where the information recording disk is used as a fixed type magnetic disk (hard disk), a decrease in the transmittance for white light does not cause a problem. Therefore, a consent of the rare earth clement exceeding 15% by weight can be used without causing any problem.

In accordance with the first feature of the invention, the rare earth element is preferably at least any one element selected from a group consisting of Gd, Tb, Dy, Ho, Er, Tm, Yb, and Lu. Any one of the above elements readily forms crystalline fine particles in the glass and has a significant effect for improving the strength.

The average particle size of the fine particles is desirably in the range of 1–50 nm. If the average particle size exceeds 50 nm, the volume fraction of the fine particles is increased, and the transmittance for white light is decreased. If the average particle size is less than 1 nm, the effect for improving the strength is not significant.

The volume fraction of the fine particles in the glass is desirably, at the utmost, 20%. If the volume fraction of the deposited particles exceeds 20%, the transmittance for white light is undesirably decreased.

In accordance with the first feature of the invention, the glass desirably contains a rare earth element in the range of 0.5–15% by weight to the total weight of the glass based on the amount converted to the oxide of $Ln_2O_3$, and additionally other components such as $SiO_2$: 40–80% by weight, $B_2O_3$: 0–20% by weight, $R_2O$ (R is an alkali metal): 5–20% by weight, RO (R is an alkali earth metal): 5–20% by weight, and $Al_2O_3$: 0–10% by weight, where the sum of $R_2O$ and RO is in the range of 10–30% by weight. The above glass is called soda lime glass. The effect generated by adding the rare earth element is particularly significant with silicates glass wherein both the alkaline element and the alkaline earth element are contained in the glass. A large portion of the added rare earth element is dissolved into the glass matrix as a solid solution, but a part of the rare earth element, which can not be dissolved into the glass matrix, is deposited as crystalline fine particles. The upper limit of dissolving the rare earth element into the glass matrix as a solid solution, that is an index indicating the easiness of depositing, varies depending on the kind of the matrix. As described previously, the strength of the glass is not increased significantly if the fine particles are not deposited sufficiently. When silicates glass containing both the alkaline element and the alkaline earth element by the above composition is used as the matrix, the rare earth element can be deposited adequately, and a glass substrate which satisfies the required strength and chemical stability for the information recording disk can be manufactured.

In accordance with the first feature of the invention, the transmittance of the glass for visible white light is desirably at least 70%. In order to use the glass substrate for a photodisk, the amount and the particle size of the deposited particles should be controlled so that at least 70% of the transmittance of the glass for the visible white light can be obtained. If the transmittance is less than 70%, the laser beam for recording information onto the recording medium decays during transmission through the glass to cause a decreasing of the S/N ratio, and other problems.

In accordance with the second feature of the present invention, a magnetic disk provided with a film of a magnetic medium for recording information formed on the surface of the substrate in the shape of a disk is provided, wherein the substrate is composed of a glass, the thickness of the substrate is, at the utmost, 0.38 mm, and the film of the magnetic medium for recording information is formed directly on the substrate.

By decreasing the thickness of the substrate, the number of the magnetic disks per volume can be increased. Therefore, if the recording density is the same, a smaller and lighter magnetic disk apparatus than previously available can be provided.

The conventional magnetic disk had a problem in that the magnetic recording medium was corroded by the alkaline element diffused from the glass substrate. Therefore, it was necessary to provide an intermediate layer composed of metallic chromium and other materials between the glass substrate and the magnetic recording medium. On the other hand, thee is very little possibility that the alkaline element in the glass substrate relating to the present invention will diffuse into the magnetic recording medium. Therefore, it is not necessary to provide an intermediate layer, and so the magnetic recording medium can be formed directly onto the substrate. Accordingly, a deterioration of the magnetic characteristics of the magnetic recording medium by influence of the structure and the composition of an intermediate layer can be avoided.

In accordance with the third feature of the present invention, a photomagnetic disk comprising a magnetic recording medium film is provided for recording information, which film is formed on one of the surfaces of a disk-shaped substrate, wherein the substrate is composed of glass, the thickness of the substrate being, at the utmost, 0.38 mm, and the diameter of the substrate being at least 2.5 inches. Generally, a photomagnetic disk has a slight warp teased on the condition of a manufacturing and a variation of the environment during use. Thus, the angle formed by the optical axis of the light head and the disk surface is deviated from a perpendicular direction by several mrad (milliradian) on account of the warp. When the light beam diameter is reduced to increase the storage capacity, the aberration and the birefringence caused by the warp is increased sharply. The aberration can be reduced by reducing the thickness of the disk. Accordingly, a stable signal can be read out even if the light beam diameter is reduced. In accordance with the glass substrate of the present invention, the thickness of the disk substrate can be reduced from the conventional 0.8 mm to 0.38 mm while retaining the disk diameter of at least 2.5 inches, and the width of allowable error in the manufacturing of the disk can be broadened.

In accordance with the fourth feature of the present invention, a glass substrate in the form of a disk for recording information is provided, comprising a medium film for recording information, which is formed on the surface of a disk-shaped substrate, wherein the substrate is composed of glass containing at least one of the rare earth elements.

In accordance with the above composition, the strength of the substrate can be ensured sufficiently even if the substrate is thin. Therefore, the production yield can be increased and the production cost can be decreased by facilitating the handling of the disk in the manufacturing process. For example, no cracks are generated even if the polishing velocity is increased to a certain level during the surface polishing step after the glass casting, and handling of the substrate in transportation after its manufacture can be facilitated.

In accordance with the fifth feature of the present invention, an information recording disk apparatus is provided, comprising at least an information recording disk, a head for reading out information from the disk or inputting information to the disk, a driver for the disk, and a driver for the head, wherein the information recording disk is the information recording disk described above in connection with the present invention.

In accordance with the above composition, an information recording disk apparatus having a large capacity can be provided at a low price because its production cost is low.

BRIEF DESCRIPTION OF THE DRAWINGS

These and other objects, features and advantages of the present invention will be understood more clearly from the following detailed description with reference to the accompanying drawings, wherein:

FIG. 2 is a graph indicating a relationship between the additive amount of $Er_2O_3$, $Al_2O_3$, and $Si_2O_4$ and the variation in thermal expansion coefficient;

DETAILED DESCRIPTION OF THE PREFERRED EMBODIMENTS

Embodiment 1

Figure 1:
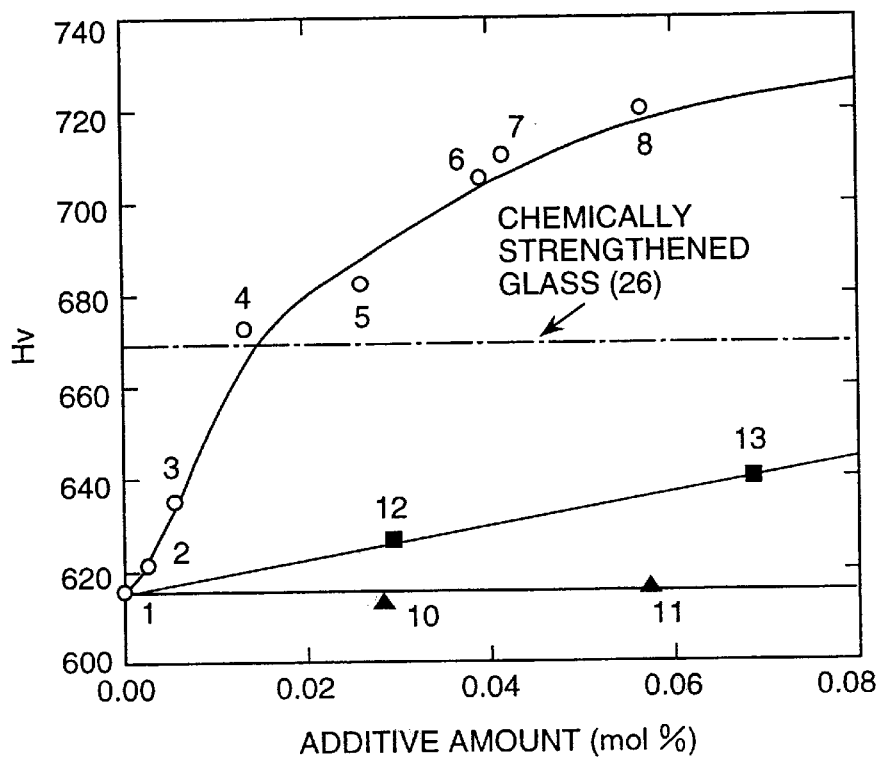
FIG. 1 is a graph indicating a relationship between the additive amount of $Er_2O_3$, $Al_2O_3$, and $Si_2O_4$ and variation in micro-dickers hardness.

Hereinafter, details of the present invention will be explained with reference to various embodiments.

In Table 1, the mixing ratio (by weight ratio) of the glass raw materials, the glass transition temperature (Tg/° C.), the thermal expansion coefficient ($\alpha \times 10^{-7}$/° C.), and micro-Vickers hardness (Hv) considered in accordance with the present invention are indicated.

TABLE 1

| | Mixing Ratio (by weight) | | | | | | |
|---|---|---|---|---|---|---|---|
| No. | $SiO_2$ | CaO | $Al_2O_3$ | MgO | $B_2O_3$ | BaO | SrO |
| 1 | 72.5 | 8.0 | 1.4 | 4.1 | — | — | — |
| 2 | 72.5 | 8.0 | 1.4 | 4.1 | — | — | — |
| 3 | 72.5 | 8.0 | 1.4 | 4.1 | — | — | — |
| 4 | 72.5 | 8.0 | 1.4 | 4.1 | — | — | — |
| 5 | 72.5 | 8.0 | 1.4 | 4.1 | — | — | — |
| 6 | 72.5 | 8.0 | 1.4 | 4.1 | — | — | — |
| 7 | 72.5 | 8.0 | 1.4 | 4.1 | — | — | — |
| 8 | 72.5 | 8.0 | 1.4 | 4.1 | — | — | — |
| 9 | 72.5 | 8.0 | 1.4 | 4.1 | — | — | — |
| 10 | 75.9 | 8.0 | 1.4 | 4.1 | — | — | — |
| 11 | 79.5 | 8.0 | 1.4 | 4.1 | — | — | — |
| 12 | 72.5 | 8.0 | 4.4 | 4.1 | — | — | — |
| 13 | 72.5 | 8.0 | 8.4 | 4.1 | — | — | — |
| 14 | 67.8 | — | 14.5 | — | — | — | — |
| 15 | 50.0 | 6.0 | 16.5 | 7.0 | — | — | — |
| 16 | 40.0 | 10.0 | 17.0 | 10.0 | — | — | — |
| 17 | 72.5 | 8.0 | 1.4 | 4.1 | 7.0 | — | — |
| 18 | 72.5 | 8.0 | 1.4 | 4.1 | — | 15.2 | — |
| 19 | 72.5 | 8.0 | 1.4 | 4.1 | — | — | 10.3 |
| 20 | 67.8 | — | 14.5 | — | — | — | — |
| 21 | 50.0 | 6.0 | 16.5 | 7.0 | — | — | — |
| 22 | 40.0 | 10.0 | 17.0 | 10.0 | — | — | — |

TABLE 1-continued

|     |      |      | Mixing Ratio (by weight) |     |     |      |      |
| --- | ---- | ---- | ---- | --- | --- | ---- | ---- |
| 23  | 72.5 | 8.0  | 1.4  | 4.1 | 7.0 | —    | —    |
| 24  | 72.5 | 8.0  | 1.4  | 4.1 | —   | 15.2 | —    |
| 25  | 72.5 | 8.0  | 1.4  | 4.1 | —   | —    | 10.3 |

| | Mixing ratio (by weight) | | | | Tg | | |
| --- | --- | --- | --- | --- | --- | --- | --- |
| No. | $TiO_2$ | ZnO | $Na_2O$ | $Er_2O_3$ | (° C.) | α | Hv |
| 1   | —   | —    | 14.0 | 0.0  | 550 | 85.0  | 615 |
| 2   | —   | —    | 14.0 | 1.0  | 560 | 88.6  | 621 |
| 3   | —   | —    | 14.0 | 2.0  | 556 | 90.2  | 635 |
| 4   | —   | —    | 14.0 | 5.0  | 585 | 91.3  | 673 |
| 5   | —   | —    | 14.0 | 10.0 | 582 | 92.2  | 683 |
| 6   | —   | —    | 14.0 | 15.0 | 590 | 93.0  | 707 |
| 7   | —   | —    | 14.0 | 16.0 | 598 | 93.5  | 712 |
| 8   | —   | —    | 14.0 | 21.0 | 608 | 93.8  | 722 |
| 9   | —   | —    | 14.0 | 32.0 | —   | —     | —   |
| 10  | —   | —    | 14.0 | 0.0  | 563 | 85.4  | 613 |
| 11  | —   | —    | 14.0 | 0.0  | 570 | 87.0  | 617 |
| 12  | —   | —    | 14.0 | 0.0  | 572 | 90.3  | 627 |
| 13  | —   | —    | 14.0 | 0.0  | 583 | 90.6  | 642 |
| 14  | —   | —    | 17.7 | 10.0 | 530 | 96.6  | 792 |
| 15  | 6.5 | 14.0 | —    | 10.0 | 545 | 110.0 | 720 |
| 16  | 7.0 | 16.0 | —    | 10.0 | 520 | 126.5 | 706 |
| 17  | —   | —    | 7.0  | 5.0  | 594 | 59.5  | 721 |
| 18  | —   | —    | 7.0  | 5.0  | 605 | 76.9  | 686 |
| 19  | —   | —    | 7.0  | 5.0  | 617 | 76.0  | 685 |
| 20  | —   | —    | 17.7 | —    | 520 | 95.4  | 735 |
| 21  | 6.5 | 14.0 | —    | —    | 521 | 103.0 | 652 |
| 22  | 7.0 | 16.0 | —    | —    | 502 | 122.4 | 634 |
| 23  | —   | —    | 7.0  | —    | 594 | 57.0  | 710 |
| 24  | —   | —    | 7.0  | —    | 588 | 77.9  | 644 |
| 25  | —   | —    | 7.0  | —    | 597 | 72.0  | 597 |

The glass transition temperature and the thermal expansion coefficient were determined from thermal expansion curves of the glass. The thermal expansion coefficient was calculated from the elongation rate of the glass from 50° C. to 500° C. The temperature elevating velocity was 5° C./minute, and the loaded weight was 10 g. A quartz glass (thermal expansion coefficient; $5 \times 10^{-7}$/° C.) was used as a standard sample. The size of the test pieces was 5 mm in diameter and 20 mm in height. The micro-Vickers hardness (Hv) was determined as an average value of ten points measured under the condition of the loaded weight of 100 g, and the weight loading time of 15 seconds.

The glass was prepared in the manner described hereinafter. A mixture of respective predetermined amounts of powder of the raw materials was put into a crucible made of platinum, and was melted at 1600° C. in an electric furnace. After melting the raw materials completely, the molten glass was stirred for one hour with a platinum stirring blade. Then, the stirring blade was taken out from the molten glass, the molten glass was allowed to stand still for 30 minutes, and a glass block was obtained by pouring the molten glass into a die made of graphite, which had been treated to approximately 300° C., and then the die was cooled rapidly. Subsequently, strain relief annealing was performed by reheating the glass block to a temperature near the glass transition temperature of the respective glass, and the glass block was then gradually cooled with a cooling velocity of 1–2° C./minute.

The glass of No. 1 in Table 1 contains silicon oxide as a main component. Taking this glass as a standard glass having a fundamental composition, various rare earth elements were added to the standard glass of 100 parts by weight. Erbium oxide ($Er_2O_3$), i.e. one of the rare earth elements, was added to the glasses of No. 2–8 in Table 1 respectively within the range of 1–21% by weight. The glass of No. 9 contained erbium oxide of 32% by weight. However, a part of the raw erbium oxide powder remained in the molten glass undissolved, and homogenous glass could not be obtained. The glasses of No. 10, 11, 12, and 13 were prepared by adding $SiO_2$ and $Al_2O_3$ increasingly to 100 parts by weight of the No. 1 glass.

The glass of No. 14 contained a further increased amount of $Al_2O_3$, and erbium oxide of 100 by weight. The glasses of No. 15 and 16 contained a more increased amount of $Al_2O_3$, and a more decreased amount or $SiO_2$ than the glass of No. 14. Furthermore, ZnO and $TiO_2$ were added as crystallizing components in addition to erbium oxide of 10% by weight.

The glass of No. 17 contained a half amount of $Na_2O$ of the glass of No. 1, and $B_2O_3$ in addition to erbium oxide of 5% by weight. The glasses of No. 18 and 19 contained a half amount of $Na_2O$ of the glass of No. 1, and additionally an alkaline earth metal oxide such as BaO, SrO, and the like. The glasses of No. 20–23 were the same glasses as No. 15–19 except no erbium oxide was contained.

As a comparative example, the Tg, α, and Hv of a glass, which was chemically strengthened by alkali replacement of the glass of No. 1, are indicated in Table 2.

TABLE 2

| No. | Tg(° C.) | α  | Hv  | Remarks                       |
| --- | -------- | -- | --- | ----------------------------- |
| 26  | 557      | 85 | 670 | Chemically strengthened glass |

The chemically strengthened procedure was performed by immersing the glass, manufactured in a flat plate of approximately 0.63 mm thickness, into a molten potassium nitrate bath at 380° C. for 40 minutes. The thickness of the chemically strengthened layer was approximately 20 μm. The Hv of the chemically strengthened glass was 670. In comparison with the Hv of 615 of the glass before the chemical strengthening, it was revealed that the Hv was increased approximately 9% by the chemical strengthening. The thermal expansion coefficient was not increased by the chemical strengthening. The glass transition temperature was increased somewhat by the chemical strengthening.

On the basis of the Hv of the chemically strengthened glass, the strength of the glasses indicated in Table 1 was evaluated. When the additive amounts of $Er_2O_3$ were 1.0% and 2.0%, respectively, by weight (No. 2, and 3), each of the micro-Vickers harnesses of the glasses was increased to 621 and 635 in comparison with the glass of No. 1. However, the increased amount was not significant, and the hardness did not reach the hardness of the chemically strengthened glass. When the additive amount of $Er_2O_3$ was 5.0% by weight (No. 4), the micro-Vickers hardness of the glass was increased to 673, exceeding the Hv of the chemically strengthened glass. In accordance with the glasses of No. 5–8, wherein the additive amount of $Er_2O_3$ was increased further to 10–21% by weight, the micro-Vickers hardness of the glass were increased further, such as to 683, 707, 712, and 722, respectively.

FIG. 1 indicates a relationship between the additive amount of $Er_2O_3$, $Al_2O_3$, and $Si_2O_4$ and the variation in the micro-Vickers hardness. The additive amount indicated by the abscissa is expressed by mol % of oxide containing two cations. That means, for example, $SiO_2$ is expressed as $Si_2O_4$, and $Er_2O_3$ and $Al_2O_3$ are expressed as $Er_2O_3$ and $Al_2O_3$ with no change. In accordance with FIG. 1, the Hv of the $Er_2O_3$ added glass is increased linearly in relation to the additive amount of $Er_2O_3$. The Hv of the glass exceeds the Hv of the chemically strengthened glass by adding $Er_2O_3$ of at least 0.013 mol % (50% by weight).

On the other hand, although an increasing tendency of the Hv can be observed with the glasses (No. 8–11), in which $Si_2O_4$, or $Al_2O_3$ has been added, the increased amount is not significant, and the Hv does not reach the level of the chemically strengthened glass even if the additive amount of $Si_2O_4$, or $Al_2O_3$ exceeds 0.05 mol %.

Figure 2:
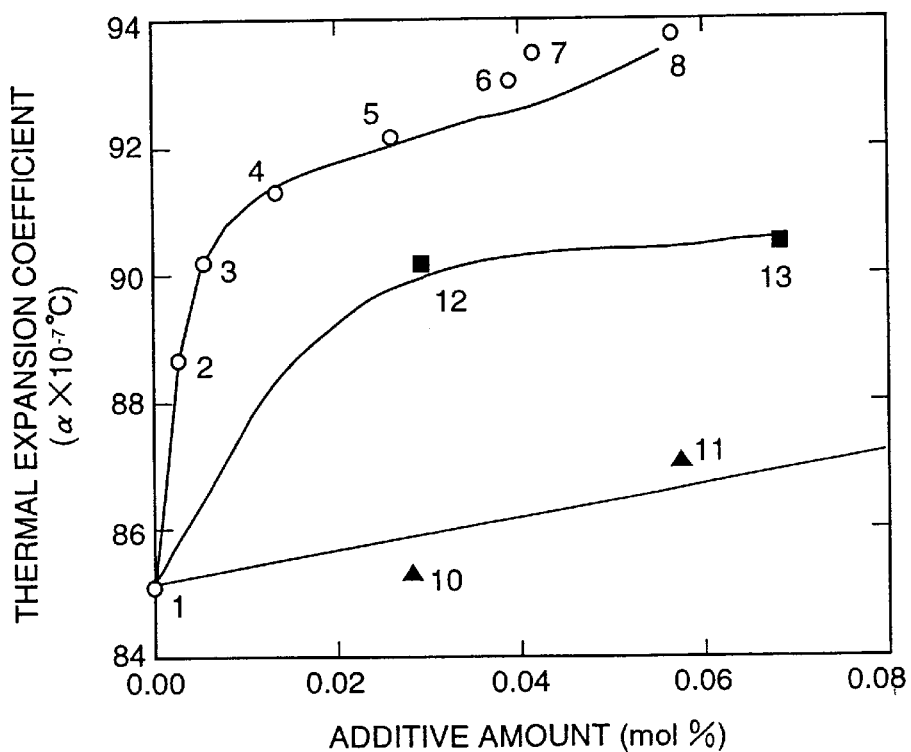
FIG. 2 is a graph indicating a relationship between the additive amount of $Er_2O_3$, $Al_2O_3$, and $Si_2O_4$ and variation in thermal expansion coefficient.

FIG. 2 indicates a relationship between the additive amount of various oxides and the variation in the thermal expansion coefficient. The thermal expansion coefficient of the $Er_2O_3$ added glass is increased in accordance with the increasing additive amount of $Er_2O_3$. Because of the large thermal expansion coefficient of the information recording medium layer, matching of the substrate with the information recording medium layer has been improved by increasing the thermal expansion coefficient of the substrate.

The Hv of the substrate could be increased significantly by adding $Er_2O_3$. However, the increase in Hv was scarcely observed when the additive amount of $Er_2O_3$ was less than 0.5% by weight, in addition to the embodiments indicated in Table 1. Therefore, $Er_2O_3$ is preferably added at least 0.5% by weight. On the contrary, when $Er_2O_3$ was added more than 30% by weight, the $Er_2O_3$ was not dissolved completely, and the obtained glass was not homogeneous. Therefore, the additive amount of $Er_2O_3$ is desirably, at the utmost, 30% by weight. The effect of adding $Er_2O_3$ in increasing the Hv and the Tg was compared with the same effect of adding each of $SiO_2$ and $Al_2O_3$, which were regarded as components to increase the mechanical strength, and it was found that the increase in the Tg was almost the same, but the addition of $Er_2O_3$ was more effective in increasing the Hv. The Hv of the glasses of No. 14–16, to which an increased amount of $Al_2O_3$ was added, respectively, were improved in comparison with the glasses of No. 20–22, to which no $Er_2O_3$ was added. The glasses of No. 15 and 16 became opaque in a heat treatment at 900° C., because crystalline particles were deposited in the glass. The Hv were measured under the above condition, and it was found that the Hv were increased, such as to 760 and 720, respectively, in comparison with the Hv before the heat treatment.

The contents of $Na_2O$ in the glasses of No. 17–19 were decreased to a half of the glass of No. 1. Therefore, an elevation of the characteristic temperature was expected, and a predetermined amount of respective one of $B_2O_3$, BaO, and SrO, which were regarded as components to decrease the melting point, was added to the glasses of No. 17–19. Furthermore, $Er_2O_3$ of 5% by weight was added to each of the glasses of No. 17–19. The Hv of all the glasses of No. 17–19 were improved in comparison with the glasses of No. 23–25, to which no $Er_2O_3$ was added.

A three point bending strength test was performed on the glasses of No. 1 and 5, and the chemically strengthened glass (No. 12) for comparison. Average values of the three point bending strength (σ/Mpa) are indicated in Table 3.

TABLE 3

| No. | n | σ(Mpa) |
|---|---|---|
| 1 | 20 | 328 |
| 5 | 20 | 391 |
| 26 | 20 | 390 |

The test was performed using glass test pieces 0.63 mm thick, 2 mm wide, and 3 mm long. The bottom span was 1.2 mm. The number of the test pieces (n) was 20 for all the glasses. The three point bending strength σ(Mpa) is expressed by the following equation:

$$\sigma(3 l w / 2 a t^2)$$

where,
w: loaded weight
l: bottom span
a: width of the test piece
t: thickness of the test piece The average three point bending strength of the glass of No. 1 was 328 MPa. The average three point bending strength of the glass of No. 5, which contained $Er_2O_3$ of 10.0% by weight, was 391 MPa, which represents an increase by approximately 19% from the glass of No. 1, and an equivalent strength to the chemically strengthened glass (No. 26) was obtained.

In order to study the mechanism of mechanical strength increment by adding rare earth element oxides, microstructures of the glasses of No. 1–8 and 10 were observed by a transmission electron microscope.

The glasses of No. 1 and 10, which contained no rare earth element oxides, were in a homogeneous amorphous condition. On the other hand, the glasses of No. 2–8 were in a condition wherein fine particles having a nano-order particle size were dispersed in an amorphous glass matrix. Based on the observation of high resolution images, the fine particles were determined as crystalline particles. As explained above, fine particles were observed in the glasses containing the rare earth element oxides, and the degree of improvement in the mechanical strength of these glasses was significant. The fine particles were not observed in the glass containing $Al_2O_3$ and others such as the glass of No. 10, and the degree of improvement in the mechanical strength of the glass was not significant. Therefore, it was concluded that the mechanical strength was increased based on the presence of the fine particles.

The particle sizes of the fine particles were different each from the others depending on the content of $Er_2O_3$. The average diameters of the fine particles generated in respective ones of the glasses and the transmittance for white light are indicated in Table 4.

TABLE 4

| No. | 2 | 3 | 4 | 5 | 6 | 7 | 8 |
|---|---|---|---|---|---|---|---|
| $Er_2O_3$ content (weight ratio) | 1.0 | 2.0 | 5.0 | 10.0 | 15.0 | 16.0 | 21.0 |
| Average diameter (nm) | 1 | 3 | 8 | 15 | 38 | 51 | 103 |
| Transmittance (%) | 91 | 85 | 79 | 74 | 70 | 67 | 58 |

Figure 3:
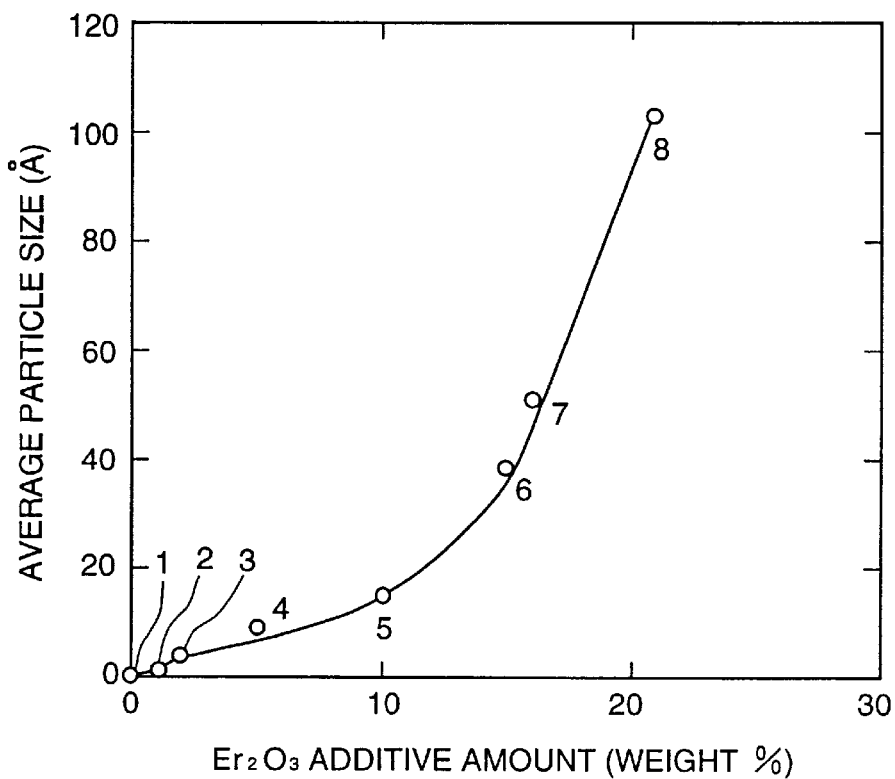
FIG. 3 is a graph indicating a relationship between the additive amount of $Er_2O_3$ and the variation in the average particle size of the deposited crystalline fine particles.
Figure 4:
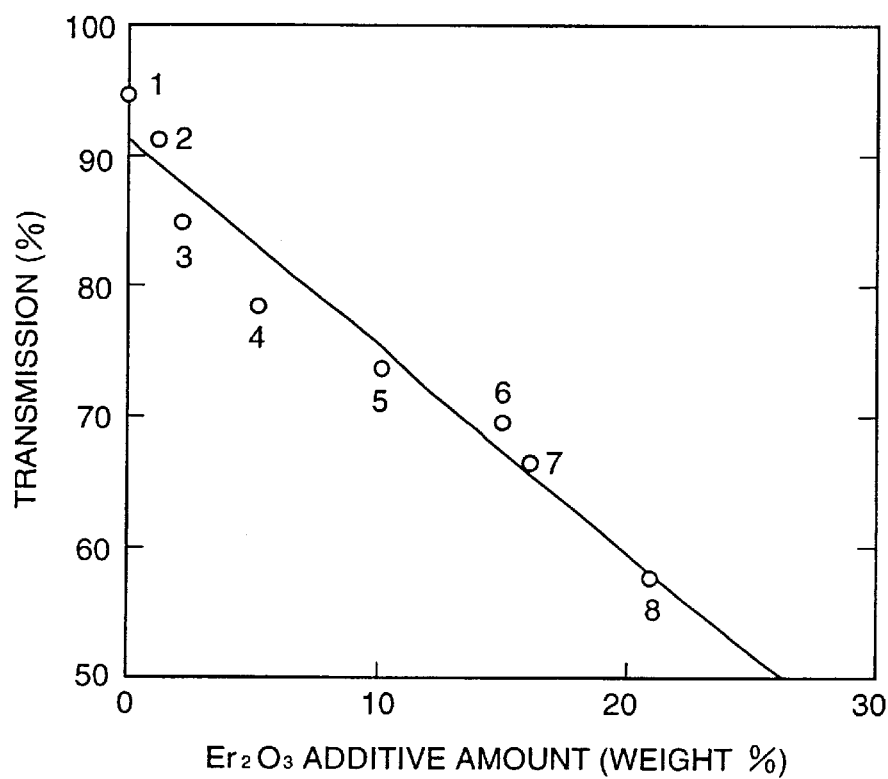
FIG. 4 is a graph indicating a relationship between the additive amount of $Er_2O_3$ and the variation in the transmittance for white light.

FIG. 3 indicates a relationship between the average particle size of the fine crystalline particles and the $Er_2O_3$ content, and FIG. 4 indicates a relationship between the transmittance of the glass and the $Er_2O_3$ content. The average particle size was increased in proportion to approximately a square of the $Er_2O_3$ content. The transmittance was decreased in negative proportion to the $Er_2O_3$ content.

The relationship between the efficiency of recording information and the transmittance of light was studied. Then, it was found that the recording of information was performed with a high efficiency when the transmittance for white light was at least 60%, and the recording of information was not performed efficiently when the transmittance for white light was less than 60%. Therefore, the transmittance for white light is desirably at least 60%. The average diameter of the glass of No. 16 was 51 nm, and the volume fraction of the fine particles calculated from the TEM photograph was 22%. On the basis of the above data, the volume fraction of the fine particles is increased and the transmittance for white light is decreased if the average diameter exceeds 50 nm. Therefore, it is not desirable if the $Er_2O_3$ content exceeds 16% by weight, the average diameter of the deposited particles exceeds 50 nm, and the volume fraction of the deposited particles exceeds 20%.

Figure 5:
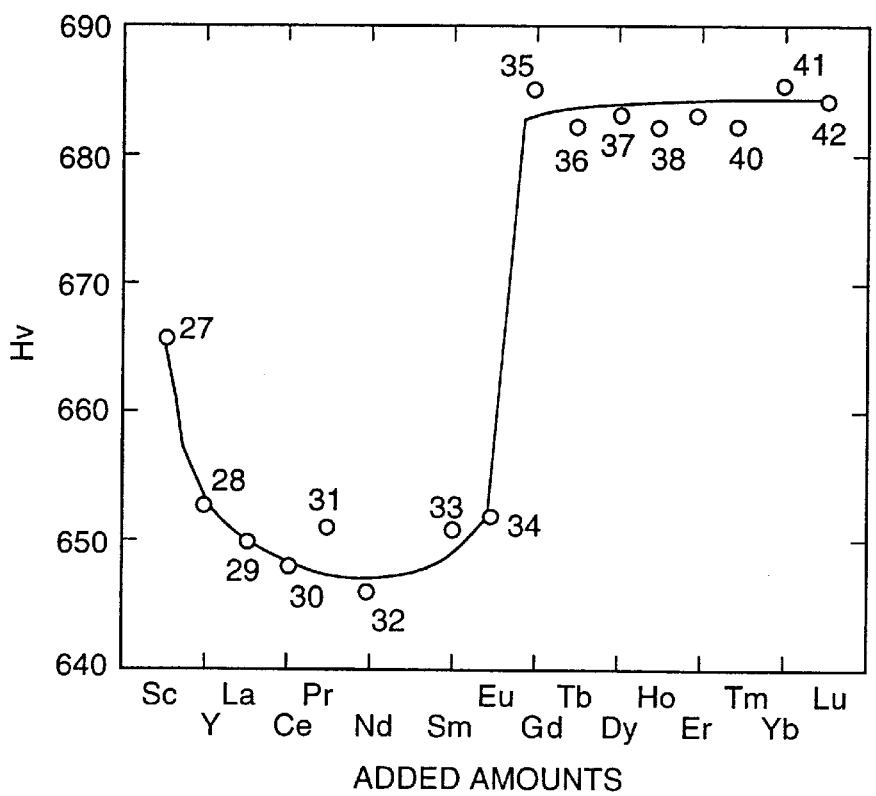
FIG. 5 is a graph indicating a relationship between the additive amount of oxides of rare earth element and the variation in the micro-Vickers hardness.
Figure 6:
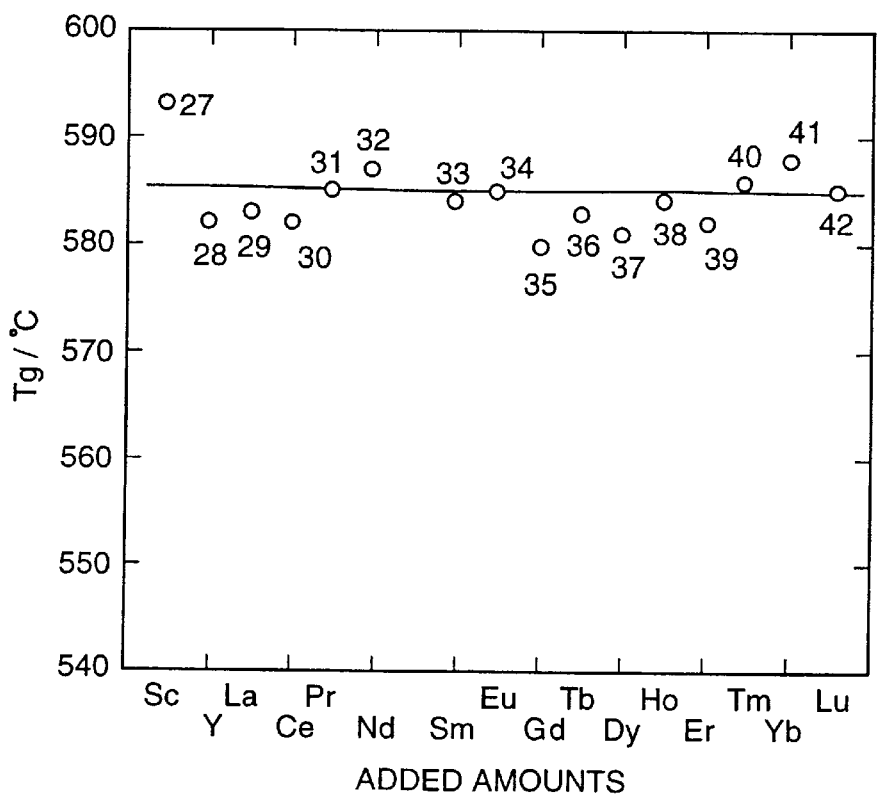
FIG. 6 is a graph indicating a relationship between the additive amount of oxides of rare earth element and the variation in the glass transition temperature.

Various rare earth elements were added to the glass of No. 1 for studying their influence. Table 5 indicates the kind of added rare earth element, as well as the glass transition temperature (Tg), the thermal expansion coefficient and micro-Vickers hardness (Hv) of the obtained glasses. FIGS. 5 and 6 indicate relationships between the kind of added rare earth elements and Hv and Tg, respectively. Each of the rare earth elements was added as an oxide expressed by the chemical formula of $Ln_2O_3$. The additive amount of all the rare earth elements was 0.026 mol %. The manufacturing method of the glass and the method of measuring the characteristics are the same as indicated in Table 1.

TABLE 5

| No. | Ln | $Ln_2O_3$ content (weight ratio) | Tg (° C.) | α | Hv |
|---|---|---|---|---|---|
| 27 | Sc | 3.58 | 593 | 91.4 | 666 |
| 28 | Y | 5.89 | 582 | 81.6 | 653 |
| 29 | La | 8.47 | 583 | 90.2 | 650 |
| 30 | Ce | 8.53 | 582 | 91.3 | 648 |
| 31 | Pr | 8.61 | 585 | 92.2 | 651 |
| 32 | Nd | 8.78 | 587 | 86.4 | 646 |
| 33 | Sm | 9.07 | 584 | 93.5 | 651 |
| 34 | Eu | 9.19 | 585 | 95.5 | 652 |
| 35 | Gd | 9.46 | 580 | 90.9 | 685 |
| 36 | Tb | 9.51 | 583 | 90.3 | 682 |
| 37 | Dy | 9.70 | 581 | 90.6 | 683 |
| 38 | Ho | 9.82 | 584 | 91.6 | 682 |
| 39 | Er | 10.00 | 582 | 92.2 | 683 |
| 40 | Tm | 10.03 | 586 | 92.0 | 682 |
| 41 | Yb | 10.30 | 588 | 90.9 | 685 |
| 42 | Lu | 10.40 | 585 | 91.1 | 684 |

In accordance with Table 5, the micro-Vickers hardness was increased in all the cases when any rare earth element was added. The amount of the increment was significant when a heavier rare earth element than $Gd_2O_3$, so-called heavy rare earth elements, was added. The hardness when a heavy rare earth element was added at least 680, which was larger than the value of Hv of the chemically strengthened glass. On the other hand, the hardness when the light rare earth element from $Sc_2O_3$ to $Eu_2O_3$ was added was approximately 650, which was smaller then the value of Hv of the chemically strengthened glass.

The glass transition temperature was constant, such as approximately 585, regardless which rare earth element was added. The thermal expansion coefficient of the glasses were in the range of $81.6-92.2 \times 10^{-7}/°$ C., and the matching of the substrate with the information recording medium layer was preferable. In accordance with the study described above, Gd, Tb, Dy, Ho, Er, Tm, Yb, and Lu are the desirable rare earth elements to be added to the glass.

When the structure of the glass of No. 21 containing $Gd_2O_3$ was observed by a TEM, crystalline fine particles the same as in the $Er_2O_3$ added glass were observed. The average particle size was 15 nm.

The composition of the base glass was studied. A content of $SiO_2$ less than 40% by weighs was not desirable, because the mechanical strength and chemical stability of the base glass were deteriorated. When the content of $SiO_2$ exceeds 80% by weight, the fusibility of the glass was decreased, and many striae were generated. The thermal expansion coefficient of the glass was decreased such a small level that the glass became inadequate to be used as a glass for the substrate. For the above reason, the content of $SiO_2$ should be desirably in the range of 40% by weight—80by weight.

When $B_2O_3$ was added to the base glass, a base glass having a superior fluidity and an adequate thermal expansion coefficient was obtained. However, when the content of $B_2O_3$ exceeded 20% by weight, the effect of improving the mechanical strength by adding the rare earth elements was decreased. Therefore, the content of $B_2O_3$ is desirably, at the utmost, 20% by weight.

Alkali metal oxides were studied. When sum of the additive amount of the alkali metal oxides ($Li_2O$, $Na_2O$, $K_2O$) exceeded 20% by weight, the chemical stability was decreased. Therefore, the sum of the content of the alkali metal oxides should be desirably in the range of 0–20% by weight. Furthermore, when the sum of the additive amount of the alkali earth metal oxides exceeded 20% by weight, the chemical stability was decreased as in the case of adding alkali metal oxides. Therefore, the sum of the content of the alkali earth metal oxides should be desirably in the range of 0–20% by weight.

Adding each of the alkali metal oxides, alkali earth metal oxides, and $B_2O_3$ has the same effect in decreasing the melting point of the glass. However, when the sum of the additive amount of the above oxides was less than 10% by weight, the fluidity was undesirable, and many striae were generated. On the contrary, when the sum exceeded 30% by weight, the chemical stability was decreased. Therefore, the sum of the additive amount of the alkali metal oxides, alkali earth metal oxides, and $B_2O_3$ should be desirably in the range of 10–30% by weight.

Adding $Al_2O_3$ was effective in increasing the mechanical strength and chemical stability of the glass. However, the content of $Al_2O_3$ exceeding 17% by weight was undesirable, because the fluidity of the glass was decreased. Therefore, the content of $Al_2O_3$ should be desirably, at the utmost, 17% by weight.

When the content of the rare earth oxides exceeded 30% by weight, homogeneous glass was hardly obtained, because raw material powder remained in the glass after the melting operation of the glass, and the content was undesirable. The smaller the sum of the content of the alkali metal oxides, the more significant will be the effect of improving the mechanical strength by adding the less amount of rare earth oxides. When the sum of the additive amounts of the alkali metal oxides and the alkali earth metal oxides was 10% by weight, an improvement in mechanical strength was observed by adding the rare earth oxides of 0.5% by weight. However, when the added amount of the rare earth oxides was less than 0.5% by weight, the effect of improving the mechanical strength was not significant. Therefore, the content of the rare earth oxides should be desirably in the range of 0.5–30% by weight.

The glass substrate relating to the present invention can be given a sufficient strength by adding the rare earth elements. Therefore, the chemical strengthening of the glass, which has been necessary for the conventional glass substrate, becomes unnecessary. That means, the glass substrate of the present invention is characterized in having no compressive strengthening layer which generates a residual stress at the surface of the glass. The presence of the compressive strengthening layer at the surface of the glass can be determined by a method, for example, wherein a laser beam is projected onto the surface of the glass and the reflected beam is spectroscopically analyzed using a prism. Using the above method, it was confirmed for the glass substrate of the present invention that a difference in the residual stresses between the inside of the glass substrate and the surface of the glass substrate hardly existed, in other words, no surface compressive strengthening layer existed.

The practical substrates were prepared actually with the glass obtained by the embodiments, and their characteristics were evaluated. The glasses of No. 1, 5, 7, 8, 18, and 35 were used. As the comparative examples, the -chemically strengthened glass of No. 26, and $SiO_2$—$Al_2O_3$—$ZnO$—$MgO$—$RO$ group crystallized glass substrate indicated in Table 6 were evaluated.

The shape of the prepared glass substrate was 65 mm in diameter and 0.635 mm in thickness. The water resistance, heat resistance, surface roughness, and transmittance for white light of the prepared substrates are indicated in Table 7.

TABLE 6

| No. | Tg(° C.) | α | Hv | Remarks |
|---|---|---|---|---|
| 43 | 780 | 114 | 720 | Crystallized glass |

TABLE 7

| No. | Water Resistance Alkaline concentration (ppm) | Heat resistance | Surface roughness Ra (Å) | Transmittance (%) |
|---|---|---|---|---|
| 5 | 10.0 | ○ | 4 | 74.0 |
| 35 | 15.0 | ○ | 4 | 94.0 |
| 26 | 312.0 | Δ | 4 | 95.0 |
| 43 | 2.0 | ○ | 9 | 15.0 |
| 1 | 11.0 | ○ | 4 | 94.0 |
| 7 | 11.5 | ○ | 5 | 67.0 |
| 8 | 10.7 | ○ | 10 | 58.0 |
| 18 | 4.0 | ○ | 5 | 79.0 |

The water resistance was evaluated by immersing the substrate into warm pure water of 80 ml at 70° C. for 20 hours, determining the amounts of total alkali elements and alkaline earth elements which dissolved into the pure water, and indicating the total dissolved amount by ppm.

The heat resistance was evaluated by heating the substrate to 350° C. in a vacuum, and subsequently analyzing the surface portion of the substrate by secondary ion mess spectrometry. The test piece, wherein a diffusion of the alkaline ions was observed at the surface layer of the substrate, was indicated by Δ, and the test piece, wherein the diffusion was not observed, was indicated by ○.

The surface roughness was evaluated by an average surface roughness Ra (Å) using a surface roughness tester. The transmittance was evaluated as an intensity ratio of incident light and transmitted light by irradiating the surface of the substrate with a white light source.

The water resistance of the glass substrates of No. 1, 5, 7, 8, 18, 35, and 43 were desirable, because the dissolved amounts of the alkaline elements were small. The chemically strengthened glass substrate of No. 26 was not desirable, because the dissolved amounts of the alkaline elements was significant.

Similarly in the treat resistance evaluation, a large amount of alkaline elements were detected at the surface layer of the chemically strengthened glass substrate of No. 26, and it was found that movement of the ions occurred. As explained above, the chemically strengthened glass substrate was unstable because it readily caused movement of the alkaline elements. On the contrary, the glass substrate of the present invention was desirable in both thermal and chemical stability.

Regarding the surface roughness, preferable flatness such as Ra=4–5 Å was obtained with the glass substrates of No. 1, 7, 18, 5, 35, and 26. On the contrary, the surface roughness of the glass substrates of No. 8 and 43 were as large as Ra=9–10 Å.

The transmittance for white light of the glasses of No. 1, 7, 5, 18, 35, and 26 were as desirable as 67–95%. The transmittance of the glasses of No. 8 and 43 were as low as 58% and 15%, respectively.

A relationship between the surface roughness and the depositing condition of the fine particles was studied. Regarding the glass of No. 7, the content of $Er_2O_3$ was 16% by weight, and the average particle size of the deposited fine particles was 51 nm. The volume fraction of the fine particles was 40%. The transmittance of the glass of No. 7 under the above condition was 67%. On the other hand, regarding the glass of No. 8, the content of $Er_2O_3$ was 21% by weight, the average particle size of the deposited fine particles was 103 nm, and the volume fraction of the fine particles was 72%. The transmittance of the glass of No. 8 under the above condition was 58%. Under the above conditions, the surface roughness of the glass of No. 7 was 5.0 Å, and the glass of No. 8 was 10.0 Å, twice that of the glass of No. 7. As explained above, it was found that when the content of $Er_2O_3$ exceeded 20% by weight, the average particle size of the deposited fine particles exceeded 100 nm, and the transmittance was less than 60%, the surface roughness of the glass was significant, and the glass was inferior in surface flatness.

In accordance with the above findings, the content of rare earth oxides such as $Er_2O_3$ is desirably less than 20% by weight. The average particle size is desirably, at the utmost, 100 nm. The transmittance is desirably at least 60%. When the above conditions are satisfied, a sufficiently small surface roughness can be obtained.

Figure 8:
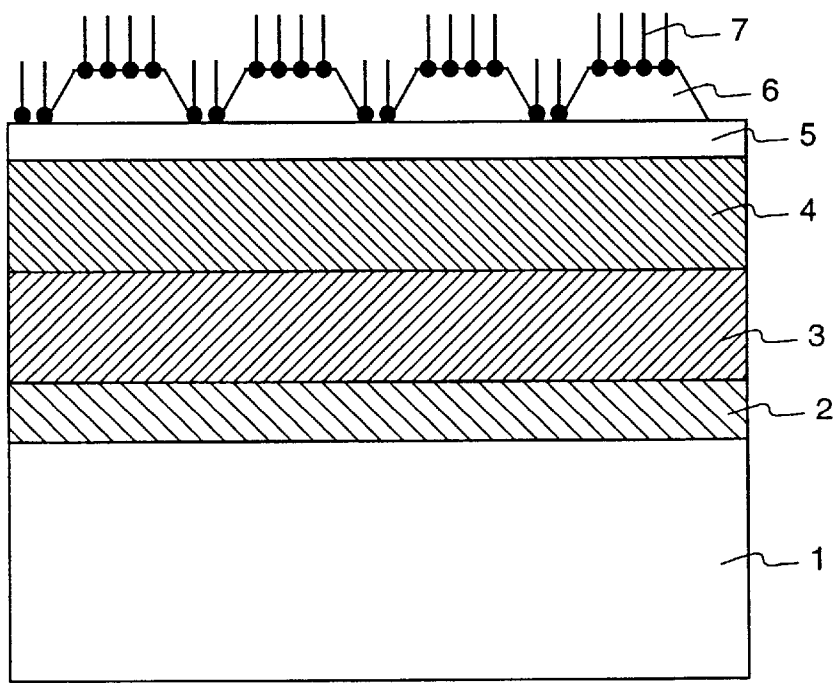
FIG. 8 is a diagrammatic cross section indicating the film composition of the magnetic disk substrate manufactured by the present invention.

Using each of the above 8 kinds of glasses, a magnetic disk was manufactured by forming a magnetic film on the glass substrate, and its characteristics were evaluated. The composition of the film of the manufactured magnetic disk is indicated in FIG. 8. In FIG. 8, the numeral 1 indicates the glass substrate, 2 denotes a Cr precoat film, 3 denotes a Cr base film, 4 denotes a Co—Cr group magnetic film, 5 denotes a C protective film, 6 denotes an etching texture, and 7 denotes a lubricating film.

After cleaning a magnetic glass substrate 65 mm in diameter, each of the Cr precoat film of 25 nm thickness, the Cr base film of 50 nm thickness, and the Co—Cr group magnetic film of 50 nm thickness was formed on the magnetic glass substrate. Then, after forming the carbon protective film of 10 nm thickness, an etching texture was provided. After performing tape cleaning, a magnetic disk was manufactured by applying the lubricating film 4. The film was formed on both surfaces of the substrate plane. Subsequently, corroded conditions of the magnetic film of the magnetic disk by an alkali and the presence of film splitting were evaluated.

Figure 10:
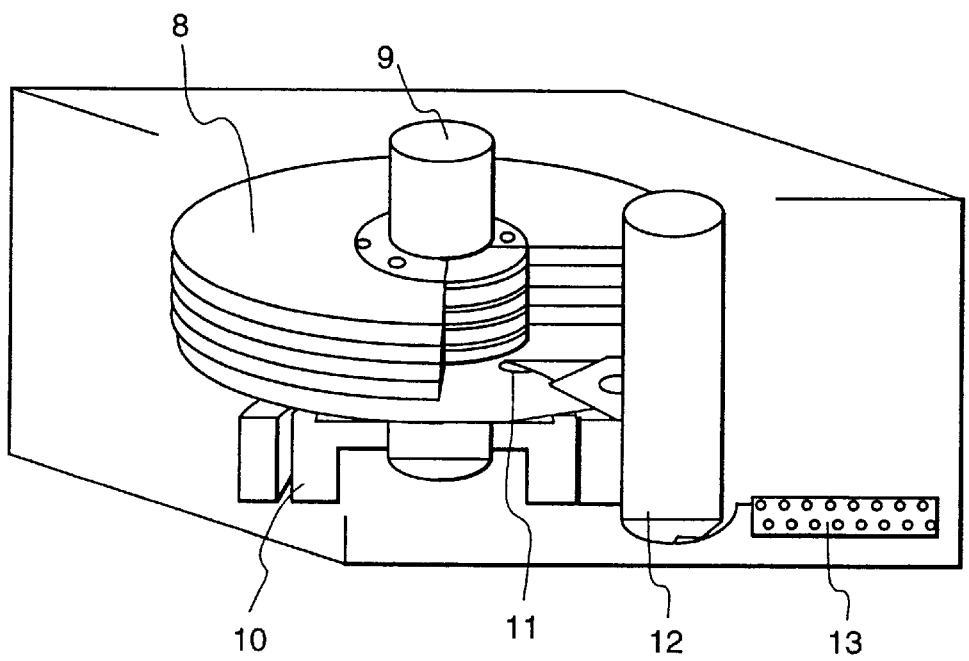
FIG. 10 is a perspective view of the magnetic disk apparatus manufactured by the present invention.

Using the above magnetic disk, a magnetic disk apparatus was manufactured. A schematic perspective view of the manufactured magnetic disk apparatus is indicated in FIG. 10. In FIG. 10, the numeral 8 indicates the magnetic disk indicated in FIG. 8, 9 denotes a rotary shaft, 10 denotes a spindle motor, 11 denotes a magnetic head, 12 denotes a rotary shaft of the magnetic head, and 13 denotes an output terminal of the electrical system. Six magnetic disks 8 were fixed to the rotary shaft 9 in the apparatus. Two magnetic heads 11 were provided at each of the surfaces of the substrate. The magnetic disk apparatus was manufactured by connecting a control system thereto. The levitating amount of the head during rotation of the magnetic disk was 40 nm.

Using the above magnetic disk apparatus, the record regenerating characteristics were evaluated. The observed results concerning alkali corrosion, film splitting, and record regenerating characteristics are indicated in Table 8.

TABLE 8

| No. | Alkali corrosion | Film splitting | Record regenerating characteristics |
|---|---|---|---|
| 5 | ○ | ○ | ○ |
| 21 | ○ | ○ | ○ |
| 12 | Δ | Δ | Δ |
| 29 | ○ | ○ | Δ |

When a ratio of the number of the magnetic disk wherein the alkali corrosion was observed was less than 5% to the total number of the obtained magnetic disks, the alkali corrosion was indicated by ○, and when the ratio was 5% or more, the alkali corrosion was indicated by Δ. The magnetic disk relating to the present invention scarcely had any alkali corrosion and/or film splitting, and the record regenerating characteristics of the magnetic disk were preferable.

The alkali corrosion and the film splitting of the chemically strengthened glass of No. 12 were significant, and the glass was undesirable. The alkali corrosion and the film splitting of the crystallized glass of No. 29 were not observed, but the record regenerating characteristics of the glass was undesirable.

Using various kinds of glass relating to the present invention, glass substrates were prepared, and a shock resistance test was performed. The shock resistance was evaluated using magnetic disks, which had the same film structure as indicated in FIG. 8, and were manufactured by forming the magnetic film, the protective film, and others onto both surfaces of the glass substrate in accordance with the same method as described above.

Figure 7:
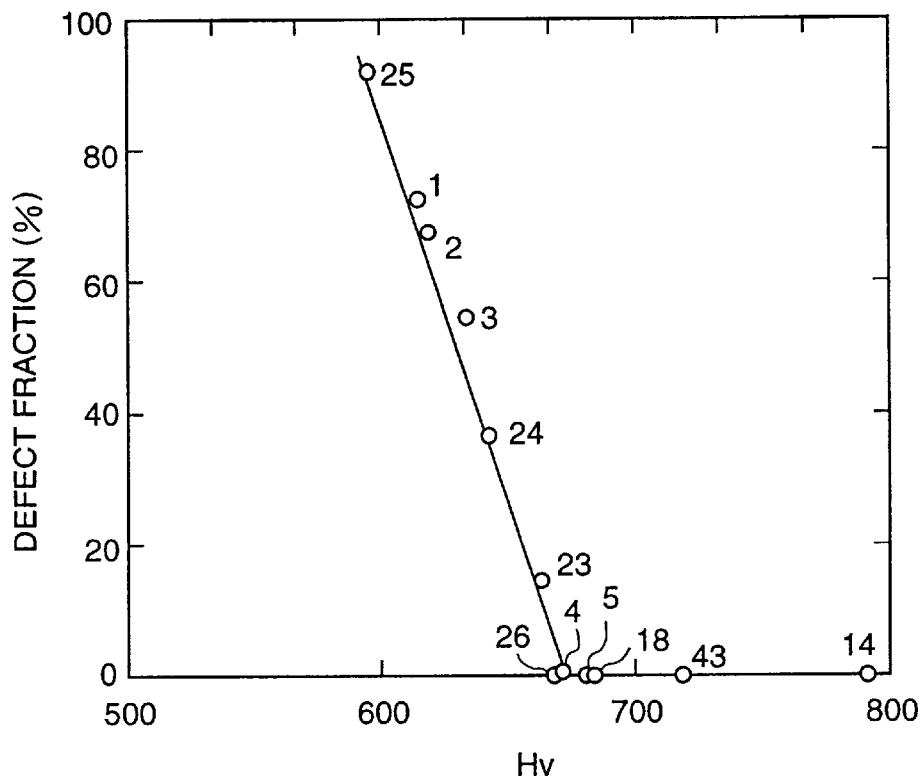
FIG. 7 is a graph indicating a relationship between the hardness (Hv) of the substrate and the defect fraction.

The test was performed by cramping the prepared disk with a jig, and causing a dummy head to impact with the disk using an accelerator. The test was performed at 30 points for each of the various kind of magnetic disks, and the shock resistance was evaluated by the frequency of the points wherein any defects such as cracks, breakage, and the like were generated. As the glass for the substrate, the glasses of No. 1–5, 14, 18, 23–26, and 43 in Table 1 were used. The results of the shock resistance test are indicated in FIG. 7. The abscissa indicates the Hv of the respective glass, and the ordinate indicates the frequency of generation of defects in the test by W. A hardness of the glass of 670 can be regarded as a boundary for the generation of defects. When the hardness of the glass is lower than 670, the generation of defects was observed, and the frequency of generation of defects was increased in accordance with decreasing hardness. When the hardness of the glass is higher than 670, the generation of defects was not observed. In accordance with the above observation, if the hardness of the glass substrate is at least 670, a magnetic disk having a sufficient shock resistance against the magnitude of shock employed in the resistance test can be manufactured.

In the same manner, optical disks and an optical disk apparatus were manufactured. Using the glass substrates of the present invention, the optical disk, of which the recording medium layers were scarcely split, could be manufactured, and the record was regenerated with a high efficiency.

As explained above, the information recording disk of the present invention was superior in chemical stability, and defects such as film splitting were scarcely generated. The record regenerating characteristics of the information recording disk apparatus was preferable. The disk and the apparatus could be manufactured with a low cost, because no chemical strengthening treatment or crystallizing treatment was performed.

Embodiment 2

Figure 9:
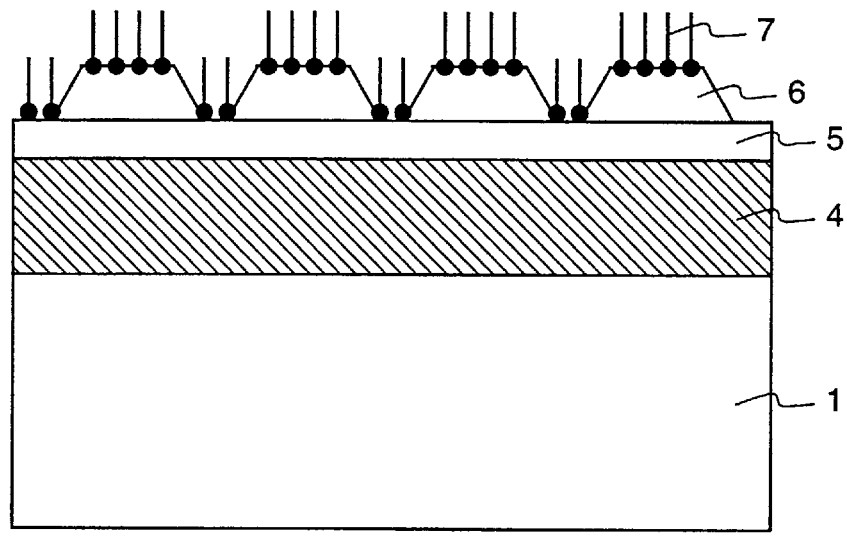
FIG. 9 is a diagrammatic cross section indicating the film composition of the magnetic disk substrate manufactured by another embodiment of the present invention.

A magnetic disk of the shape indicated in FIG. 9 was manufactured using the glass substrate of the present invention. The thickness of the substrate was 0.38 mm. The glass of No. 5, which was not treated for chemical strengthening, was used in manufacturing the magnetic disk. The precoat film, which was generally formed in a routine operation, was not formed, and the magnetic thin film was formed directly onto the surface of the glass substrate. The surface roughness of the glass substrate Ra=4.0 Å.

As comparative examples, magnetic disks were manufactured using soda lime glass strengthened by alkali strengthening treatment, normal soda lime glass without the alkali strengthening treatment, and crystallized glass, as the substrates.

The results of evaluating the strength, flatness, alkali corrosion of the magnetic film, and magnetic characteristics of the magnetic disks are indicated in Table 9. Preferable characteristics are indicated by ○, and characteristics which are not preferable are indicated by Δ.

TABLE 9

| Substrate | Strength | Flatness | corrosion[1] | Magnetic characteristics | Remarks |
|---|---|---|---|---|---|
| No. 5 glass | ○ | ○ | ○ | ○ | Embodiment |
| Chemically strengthened soda lime glass | ○ | ○ | Δ | Δ | Comparative example |
| Soda lime glass without chemical strengthening | Δ | ○ | ○ | ○ | Comparative example |
| Crystallized glass | ○ | Δ | ○ | Δ | Comparative example |

[1]Alkali corrosion of the magnetic film

The magnetic disk of the present invention had a desirable strength, and the thickness of 0.380 mm gave it a sufficient strength for practical use. The flatness was also preferable. Corrosion of the magnetic film was not observed, and the magnetic film was not deteriorated even if no precoat film was formed. The levitating amount of the magnetic head could be set as, at the utmost, 30 nm, because the flatness of the disk is preferable, and the magnetic characteristics were also superior.

The soda lime glass treated for chemical strengthening obtained a high mechanical strength. However, the magnetic film was corroded with the alkaline component of the glass, because no precoat film was formed, and, as a result, deposition of the alkaline components onto the surface of the levitating plane of the magnetic head, after performing a practical sliding test, was frequently observed. Furthermore, after the sliding test, splitting of the magnetic film was observed. Even for the magnetic disk, which did not cause any defects, its magnetic characteristics were generally deteriorated. The magnetic disk manufactured using the soda lime glass without a chemical strengthening treatment did not have a sufficient strength for practical use. The crystallized glass had a large surface roughness, and the levitating amount of the magnetic head was too large to obtain preferable magnetic characteristics, because the flatness was undesirable.

We Claim:

1. A substrate of a disk for recording information comprising a layer for recording information, wherein
   a recording information disk comprising a layer for recording information and a substrate, wherein
   said substrate is made of glass containing at least one of rare earth elements selected from a group consisting of Gd, Tb, Dy, Ho, Er, Tm, Yb, Lu.
2. A substrate according to claim 1, wherein
   said substrate comprises fine particles and glass matrix, and said find particles are dispersed in said glass matrix.
3. A substrate according to claim 2, wherein
   said fine particles are crystalline and
   said glass matrix is amorphous.
4. A substrate according to claim 2, wherein
   said glass matrix is any of soda lime glass and silicates glass.
5. A substrate according to claim 2, wherein
   said rare earth element is included in said fine particles and said glass matrix.
6. A substrate according to claim 2, wherein
   an average particle size of said fine particles is in the range of 1–100 nm.
7. A substrate according to claim 2, wherein
   a volume fraction of said fine particles is in the range of 1%–40% to the total volume of said substrate.
8. A substrate according to claim 1, wherein
   a transmittance for visible white light of said substrate is at least 60%.
9. A substrate according to claim 1, wherein
   said substrate has a hardness at least Hv 670.
10. A substrate according to claim 1, wherein
    said substrate has thermal expansion coefficient in the range of $70–130 \times 10^{-7}$.
11. A substrate according to claim 1, wherein
    said substrate includes said rare earth element in the range of 0.5–15% by weight to the total amount of said substrate on a basis of converted weight to oxide Ln2O3 (Ln is rare earth element).
12. A substrate according to claim 1, wherein
    said substrate includes $Er_2O_3$ in the range of 0.5–30% by weight to the total amount of said substrate,
    a volume fraction of said fine particles is in the range of 1%–20% to the total volume of said glass, and
    an average particle size of said fine particles is in the range of 1–50 nm.
13. A substrate according to claim 12, wherein
    said recording information disk is a photodisk or a photomagnetic disk,
    a transmittance for visible white light of said substrate is at least 60%.
14. A recording information disk comprising a layer for recording information and a substrate, wherein
    said substrate is the substrate claimed in claim 1.
15. A recording information disk according to claim 14, wherein
    said recording information disk is a magnetic disk,
    said layer for recording information is a magnetic recording medium film.
16. A recording information disk according to claim 15, wherein
    said magnetic recording medium film is formed directly on the surface of said substrate.
17. A recording information disk according to claim 14, wherein
    said recording information disk is a photodisk or a photomagnetic disk,
    the thickness of said substrate is, at the utmost, 0.38 mm, and
    the diameter of said substrate is at least 2.5 inches.
18. An information recording disk apparatus comprising a disk for recording information,
    a head for reading out information from said disk or inputting information to said disk,
    a driver for said disk, and
    a driver for said head, wherein
    said disk is the recording information disk claimed in claim 14.
19. An hard disk apparatus comprising a magnetic disk for recording information,
    a head for reading out information from said magnetic disk or inputting information to said magnetic disk,
    a driver for said magnetic disk, and
    a driver for said head, wherein
    said magnetic disk comprises the substrate claimed in claim 1.

* * * * *